United States Patent
Bernard

(10) Patent No.: US 6,715,443 B2
(45) Date of Patent: Apr. 6, 2004

(54) FEEDER DEVICE FOR ANIMALS

(76) Inventor: Andre Bernard, 390 Belvedere, Thedford Mines, QBC (CA), G6G 7G1

( * ) Notice: Subject to any disclaimer, the term of this patent is extended or adjusted under 35 U.S.C. 154(b) by 0 days.

(21) Appl. No.: 10/211,572

(22) Filed: Aug. 5, 2002

(65) Prior Publication Data

US 2002/0185074 A1 Dec. 12, 2002

Related U.S. Application Data

(63) Continuation-in-part of application No. 09/702,607, filed on Nov. 1, 2000, now abandoned.

(51) Int. Cl.[7] .................................................. A01K 5/02
(52) U.S. Cl. .................................. 119/51.13; 119/51.11; 119/56.1
(58) Field of Search ........................... 119/51.04, 51.11, 119/51.13, 51.14, 56.1

(56) References Cited

U.S. PATENT DOCUMENTS

| | | |
|---|---|---|
| 1,429,297 A | 9/1922 | O'Neill et al. |
| 2,585,371 A | 2/1952 | Coffing |
| 3,195,508 A | 7/1965 | Lehman et al. |
| 3,683,859 A * | 8/1972 | Kirk ........................ 119/51.13 |
| 3,717,127 A | 2/1973 | Porterfield |
| 3,884,189 A * | 5/1975 | Ruth ....................... 119/51.13 |
| 4,565,159 A | 1/1986 | Sweeney |
| 4,665,863 A | 5/1987 | Toledo |
| 4,688,520 A | 8/1987 | Parks |
| 4,729,344 A | 3/1988 | Winkel |
| 4,986,220 A | 1/1991 | Reneau et al. |
| 5,143,289 A | 9/1992 | Gresham et al. |
| 5,333,572 A | 8/1994 | Nutt |
| 5,435,267 A | 7/1995 | Patterson |
| 5,618,548 A | 4/1997 | Dawson |
| 5,899,169 A | 5/1999 | Jenson |
| 5,914,119 A | 6/1999 | Dawson |
| 6,367,417 B1 * | 4/2002 | Gal et al. .................. 119/51.5 |
| 6,557,490 B1 * | 5/2003 | Vaughn ..................... 119/56.1 |

* cited by examiner

Primary Examiner—Robert P. Swiatek

(57) ABSTRACT

A feeder device for feeding animals with food product includes a housing divided into a plurality of compartments with individual pivotable bottom walls and an operating system mounted on the housing to control opening of the bottom walls to release the food product contained therein. The operating system includes a locking mechanism located adjacent each bottom wall to releasably secure it in a closed position. An opening mechanism successively activates the locking mechanisms and opens the bottom walls. A timer device including an electronic controller and a limit switch electrically coupled to the opening mechanism controls the operation of the latter at the beginning of a pre-determined time interval. The limit switch is activated by the opening mechanism and stops operation of the opening mechanism during the pre-determined time interval.

19 Claims, 6 Drawing Sheets

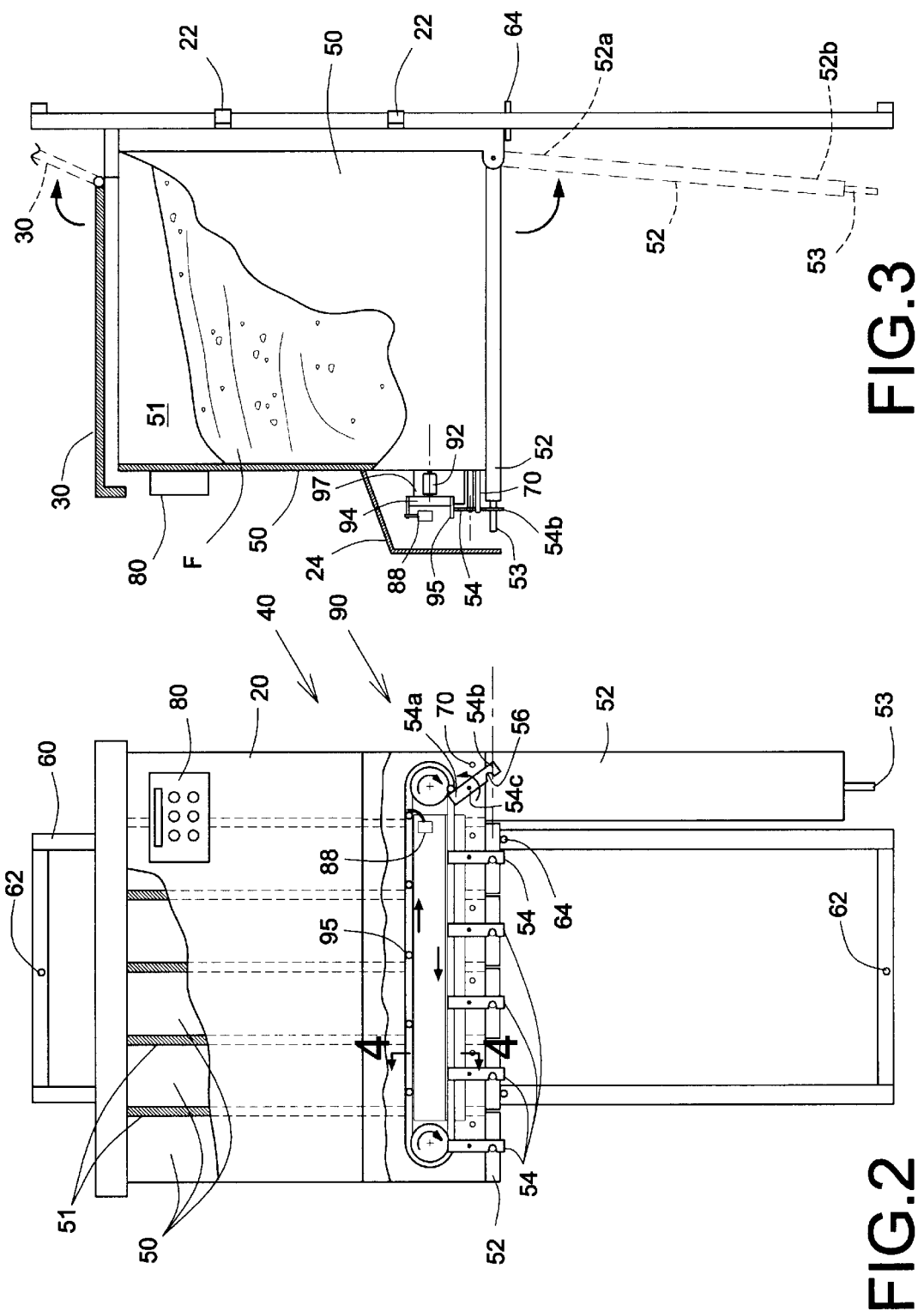

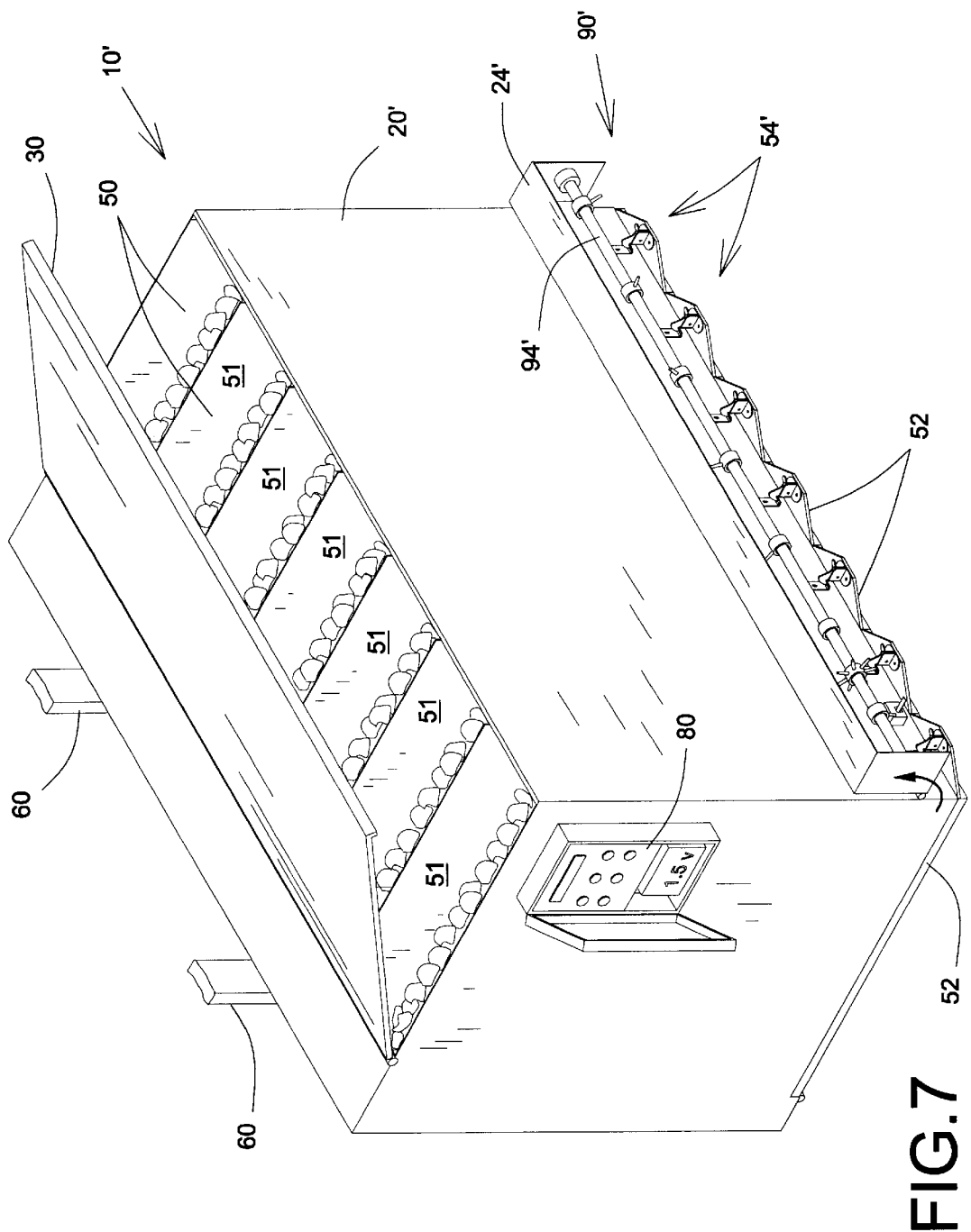

US 6,715,443 B2

FEEDER DEVICE FOR ANIMALS

CROSS-REFERENCE TO RELATED APPLICATION

The present application is a Continuation-In-Part (C.I.P.) of corresponding U.S. patent application Ser. No. 09/702,607 filed on Nov. 1, 2000, now abandoned.

FIELD OF THE INVENTION

The present invention relates generally to devices for feeding animals, and more specifically, to programmable feeding devices that periodically dispense aggregate feed material.

BACKGROUND OF THE INVENTION

The programmable feeding devices are known in the art, and a variety of devices have been developed which are powered by electrical or mechanical means. However, these presently known devices have a number of disadvantages and limitations, which decrease their utility.

The limitation of the prior art is that in many situations, particularly with respect to the feeding of wild animals, the location most desirable for providing the feed is so remote that someone cannot practically reach it too often to bring the animal feed thereat.

SUMMARY OF THE INVENTION

It is therefore a general object of the present invention to provide an improved feeder device for animals.

An advantage of the present invention is that the feeder device for animals can be easily carried by a person.

Still another advantage of the present invention is that the feeder device for animals can distribute efficiently the feed for animals in the programmable time without assistance.

A further advantage of the present invention is that the feeder device for animals can be easily carried and temporarily located in different remote places most desirable for distributing the feed.

According to the present invention, there is provided a standalone feeder device for feeding animals with food product, said feeder device comprises:

a housing for being filled with said food product, said housing defining internal walls, said internal walls dividing said housing into a plurality of compartments adjacent to each other, each of said compartment having a bottom wall, said bottom wall defining generally opposed first and second wall ends, said first wall end being pivotally secured to said housing, said bottom wall pivoting between a closed position wherein said bottom wall retains said food product within said corresponding compartment and an open position wherein said food product is released from said corresponding compartment;

an operating system mounted on said housing and controlling opening of said bottom walls, said operating system including:

a locking mechanism located adjacent said second wall end of each of said bottom walls to secure said bottom wall in said closed position with said food product retained inside said corresponding compartment;

an opening mechanism successively activating said locking mechanisms so as to allow said bottom wall to pivot into said opened position and release said food product from said corresponding compartment;

a self-contained power source electrically coupled to said opening mechanism to power the latter; and a timer device electrically coupled said power source, said timer device including an electronic controller and a limit switch member electrically coupled thereto, said electronic controller being electrically coupled to said opening mechanism for operation thereof at the beginning of a pre-determined time interval, said limit switch member being activated by said opening mechanism and stopping operation of said opening mechanism during said pre-determined time interval.

Preferably, the timer device further includes a key pad electrically coupled to said electronic controller for programming the latter about the length of said pre-determined time interval between successive activation of said opening mechanism to activate said locking mechanisms so that said bottom walls are allowed to pivot in said open position and release said food product from said corresponding compartment.

Preferably, the feeder device further comprises a support structure releasably supporting said housing thereon, said support structure allowing for said housing to be installed at a pre-determined height to avoid animal-caused damages on said housing.

Preferably, the support structure includes a strap member mounted thereon so that said feeder device is back carryable by a person.

Preferably, the housing is slidably mounted on said support structure so that said pre-determined height is adjustable.

Preferably, the opening mechanism activates one of said locking mechanisms at a time before activating said limit switch member, the latter stopping operation of said opening mechanism before activation of a successive of said locking mechanisms.

Preferably, each of said compartments has a volume substantially equal the others.

Preferably, the housing includes a top wall, said top wall being pivotally mounted on said housing between a top wall closed position to close off said compartments and a top wall open position to allow insertion of said food product into said compartments.

Preferably, the power source is a 12 VDC battery.

Alternatively, the power source is a first power source, said operating system including a second power source electrically connected to said opening mechanism; the first and second power sources being 1.5 VDC and 12 VDC batteries, respectively.

Preferably, each of said locking mechanisms includes a pin component mounting on said second wall end and a hook component pivotally mounting on said housing adjacent said second wall end when said bottom wall is in said closed position, said hook component pivoting between a hooking configuration and a unhooking configuration, said hook component releasably engaging said pin component with said bottom wall in said closed position when in said hooking configuration and releasing said pin component with said bottom wall in said opened position when in said unhooking configuration.

Preferably, the opening mechanism includes a chain system and an electric motor driving said chain system, said chain system having a chain component with a plurality of rod components mounted thereon, said rod components being spaced apart from each other along said chain component so that said rod components alternately activate said hook components by pivoting the latter from said hooking configuration to said unhooking configuration and said limit switch member, whereby said limit switch member is activated just after one of said hook components has been activated so as to stop said electric motor of said opening mechanism before the opening of next adjacent of said bottom walls.

Preferably, each of said hook components defines generally opposed first and second hook ends and an intermediate section therebetween, said intermediate section being pivotally attached to said housing, said first hook end including a pin aperture releasably receiving said pin component therein when in said hooking configuration, said rod components abuttingly engaging said second hook end to pivot said hook component from said hooking configuration to said unhooking configuration.

Preferably, each of said locking mechanisms further includes a retainer component to limit pivoting movement of said hook component in said unhooking configuration so as to prevent said first hook end from getting too close to said chain system, thereby avoiding obstruction of the latter.

Alternatively, each of said locking mechanisms includes a hook component mounting on said second wall end and a pin component pivotally mounting on said housing adjacent said second wall end when said bottom wall is in said closed position, said hook component pivoting between a hooking configuration and a unhooking configuration, said hook component releasably engaging said pin component with said bottom wall in said closed position when in said hooking configuration and releasing said pin component with said bottom wall in said opened position when in said unhooking configuration.

Preferably, the opening mechanism includes a shaft system and an electric motor driving said shaft system, said shaft system having a shaft component with a plurality of rod components radially extending therefrom, said rod components being circumferentially spaced apart from each other about said shaft component so that said rod components alternately activate said hook components by pivoting the latter from said hooking configuration to said unhooking configuration and said limit switch member, whereby said limit switch member is activated just after one of said hook components has been activated so as to stop said electric motor of said opening mechanism before the opening of next adjacent of said bottom walls.

Preferably, each of said hook components defines generally opposed first and second hook ends and an intermediate section therebetween, said intermediate section being pivotally attached to said second wall end, said first hook end including a pin aperture releasably receiving said pin component therein when in said hooking configuration, said rod components abuttingly engaging said second hook end to pivot said hook component from said hooking configuration to said unhooking configuration.

Preferably, each of said hook components include a biasing spring, said biasing spring biasing said hook component into said hooking configuration so that said bottom wall is releasably secured in said closed position until one of said rod components abuts said second hook end to pivot said hook component into said unhooking configuration against said biasing spring, thereby releasing said bottom wall into said open position.

Preferably, the rod components are divided into a first set and a second set, said rod components of said first set being used to successively activate said hook components, said rod components of said second set being used to successively activate said limit switch member, said rod components of said first set and said rod components of said second set alternately activating one of said hook components and said limit switch member, respectively.

Other objects of the present invention will become apparent from a careful reading of the detailed description provided herein, with appropriate reference to the accompanying drawings.

BRIEF DESCRIPTION OF THE DRAWINGS

In the annexed drawings, like reference characters indicate like elements throughout.

FIG. 2 is a partially broken front view of the embodiment of FIG. 1;

FIG. 3 is a partially broken side view of the embodiment of FIG. 1;

FIG. 7 is a perspective view of a feeder device for animals constructed in accordance with another embodiment of the present invention;

DETAILED DESCRIPTION OF THE PREFERRED EMBODIMENTS

With reference to the annexed drawings, the preferred embodiments of the present invention will be described for indicative purposes and by no means as of limitation.

Figure 1:
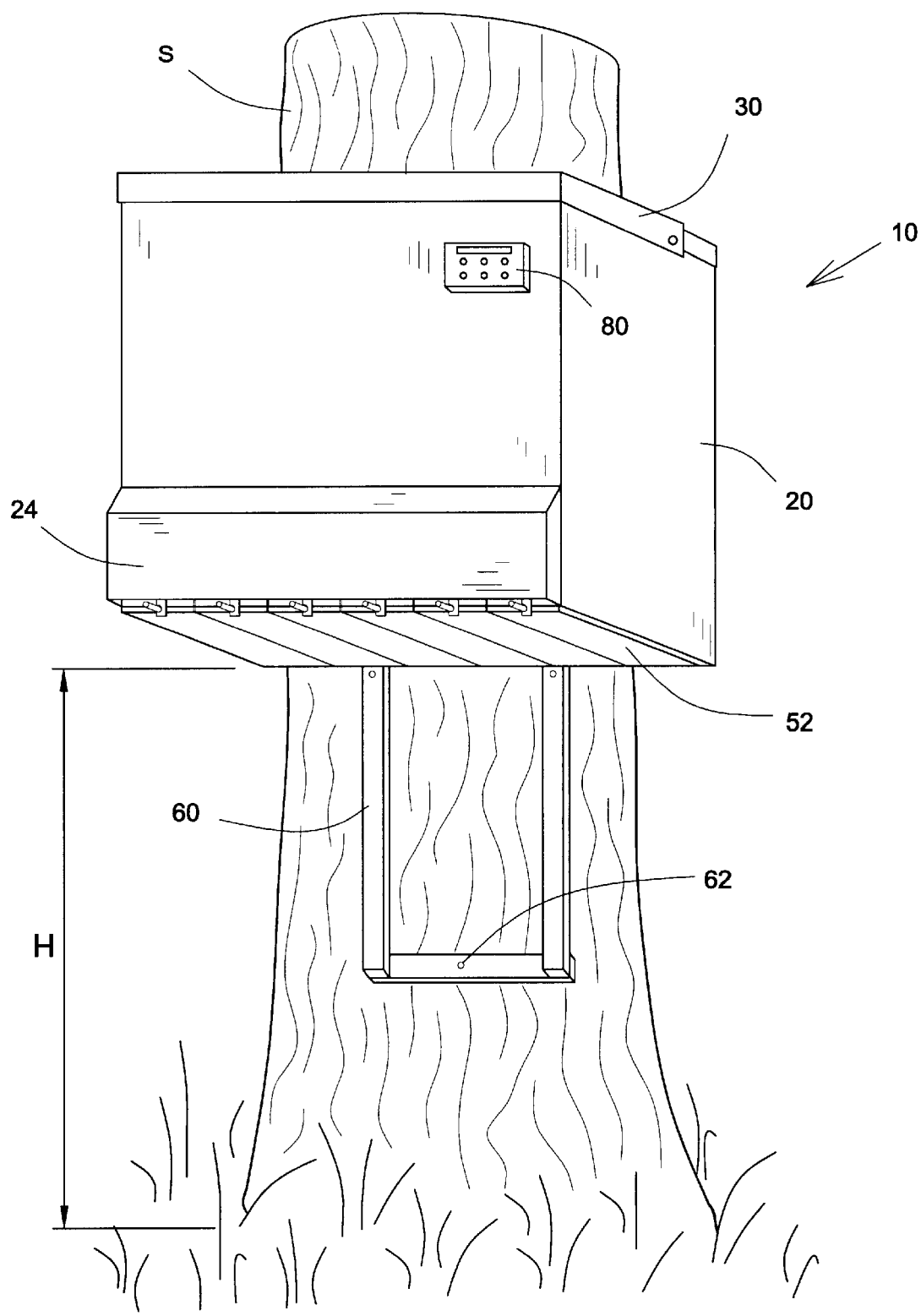
FIG. 1 is a perspective view of a feeder device for animals constructed in accordance with an embodiment of the present invention installed in a proper height to prevent animal-caused damages.

Referring to FIG. 1, there is shown a standalone feeder device 10 for preferably periodically feeding animals, such as wild animals, according to an embodiment of the present invention arranged above the ground at a proper height H to avoid and prevent any possible animal-caused damages. As shown in FIGS. 2 to 5, the feeder device 10 for animals includes an operating system 40 for programmable feed operation, a housing 20 preferably releasably mounted on a support structure 60 via brackets 22 and having a top wall or lid 30 for filling the housing 20 with food product F suited for the animals to be fed. The top lid 30 is preferably pivotally mounted on the housing 20 between a top wall closed position to close off the housing 20 and a top wall open position to allow insertion of the food product F into said the housing 20.

The housing 20 is divided into a plurality of, preferably six in shown in FIG. 1, independent compartments 50 adjacent to each other via internal separating walls 51, each compartment 50 preferably having a volume substantially equal to the others. Each compartment 50 has an individual bottom wall 52 pivotally secured to the housing 20 at its first wall end 52a and having a protruding pin component 53 mounted on its second wall end 52b opposed to the first wall end 52a. The pin 53 is adapted to releasably engage a hook component 54 mounted on the housing 20 adjacent the second wall end 52b when the bottom wall 52 is in a closed position closing off the housing 20 to retain the food product F inside the compartment 50. The pin 53 and the hook 54 components form a locking mechanism that releasably secures the bottom wall 52 in its closed position. The bottom wall 52 pivots between a generally horizontal closed position and a generally vertical open position to allow for the food product F to be released therefrom and fall on the ground, as shown in solid and dashed lines respectively in FIG. 3.

Each hook component 54 defines generally opposed first 54b and second 54a hook ends and an intermediate section 54c therebetween. The intermediate section 54c of the hook component 54 is preferably pivotally attached to the housing 20 to pivot between a hooking configuration and a unhooking configuration shown in the left and right hand sides of FIG. 2, respectively. The first or lower hook end 54b includes a pin aperture 56 that releasably receives the pin component 53 therein when the hook component 54 is in its hooking configuration.

Figure 5:
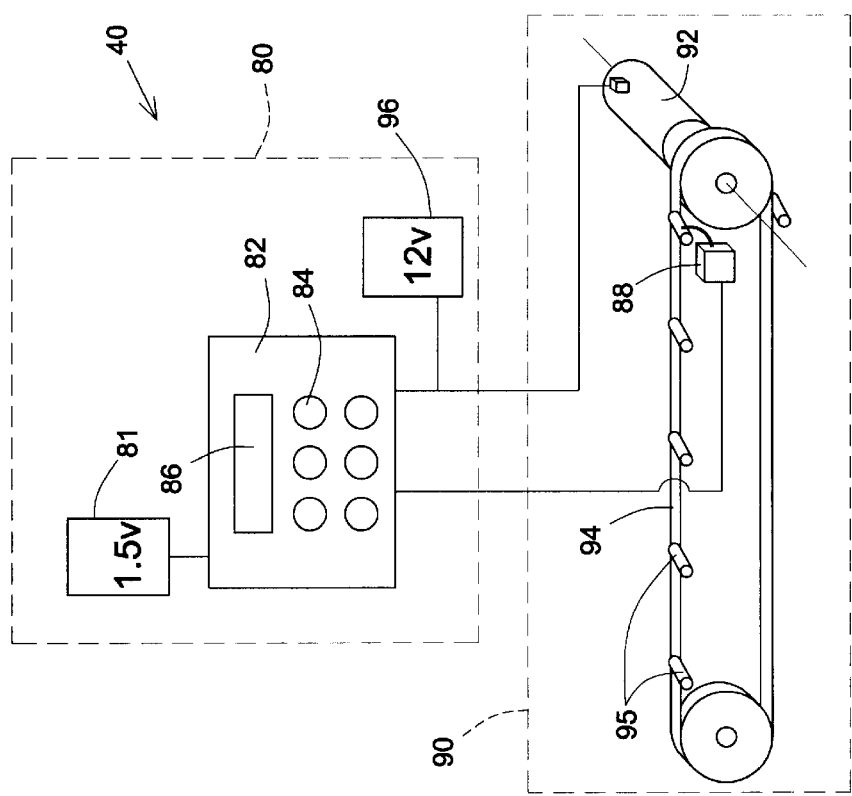
FIG. 5 is a schematic operating diagram of the embodiment of FIG. 1.

The operating system 40 includes a timer device 80 that controls an opening mechanism 90 to successively open the bottom walls 52 of the compartments 50 from their closed position at the beginning of a pre-determined time interval. The timer device 80 and the opening mechanism 90 are connected to a preferably respective power source for proper operation, as illustrated in FIG. 5.

The timer device 60 includes an electronic controller 82, a keypad 84 for programming the latter to allow selection of the length of the pre-determined time interval, of preferably every 24 hours, for the operation the opening mechanism 90, a display member 86 and a limit switch member 88 to stop the opening mechanism 90. The opening mechanism 90 is activated by the timer device 80 only for opening of one of the bottom walls 52 at a time and includes an electric motor 92 for driving a chain system. The chain system includes a chain 94 and a plurality of rod components 95, preferably six, extending transversely therefrom to alternately abuttingly engage the second or upper hook end 54a of one of the hook component 54 at a time so as to pivot the hook component 54 from its hooking configuration to its unhooking configuration and activate the limit switch 88 to stop the motor 92 Just before the release of the next pin 53. Preferably, the first rod 95 is used to successively activate the locking mechanisms and release the bottom walls while the remaining rods 95 are used to successively activate the limit switch 88 that stops the opening mechanism 90, in alternate fashion with the release of the bottom walls 52.

The controller 82 will re-activate the opening mechanism 90, to restart the same operation, after the next pre-determined time interval has elapsed, and so on until all compartments 50 are empty and need to be refilled, for proper operation.

Depending on the configuration of the locking mechanism 54, each of them preferably includes a retainer component 70 adapted to limit the pivoting movement of the hook component 54 in its unhooking configuration so as to prevent the lower hook end 54b from getting too close to the chain 94 and avoid obstruction of the latter, while still allowing its upper end 54a to fully clear the rods 95.

As shown in FIG. 1, the support structure 60 is secured at a proper height H, preferably using nails 62 or the like on a standing structure S, such as a tree in the forest, found at remote locations.

Figure 4:
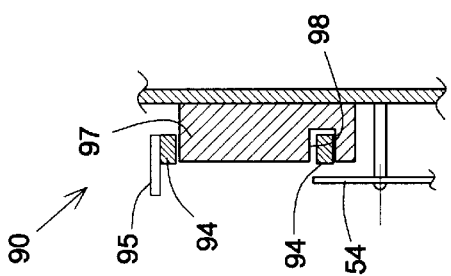
FIG. 4 is an enlarged partial section view taken along line 4—4 of FIG. 2.

Obviously, the chain 94 has a quantity of rods 95 corresponding to the quantity of compartments 50 in the housing 20. Preferably, the chain 94 slidably follows a guiding member 97, that ensures an adequate running path for chain 94 and its rods 95. The guiding member 97 is preferably made out of plastic material for easy sliding of the chain 94 thereon, as shown in FIG. 4.

Figure 6:
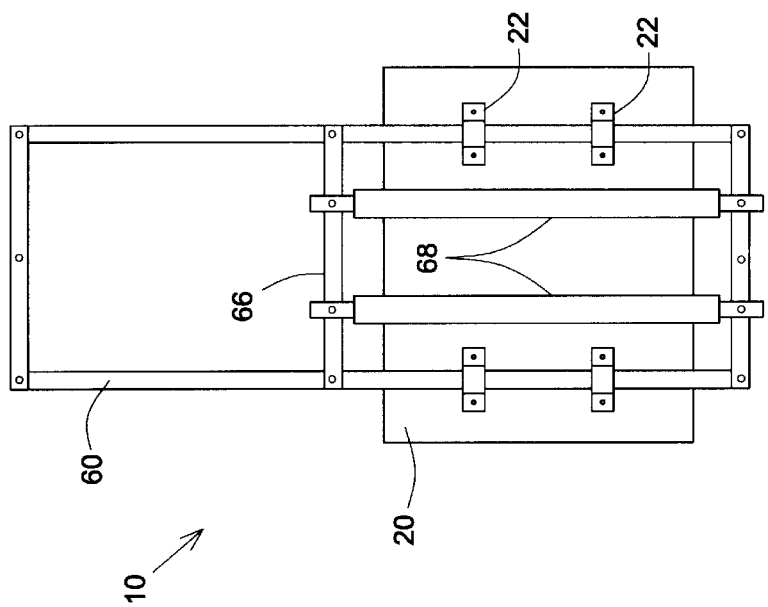
FIG. 6 is a back view of the embodiment of FIG. 1.

Furthermore, and with particular reference to FIG. 6 the support structure 60 preferably has a strap member 68 adapted for back carrying of the feeder device 10 by a person and to a temporary frame bar 66, also releasably secured to the structure 60 with the housing 20 in a lower position on the support structure 60. This lower position also ease the filling of the housing 20 with food product F when the feeder device 10 is mounted against a structure S. When in use, the housing 20 is preferably slidably positioned in an upper position as shown in FIGS. 1 to 3, and preferably retained in that position by pins 64 or the like. The top lid 30 is preferably pivotally mounted to the housing 20 as shown in FIG. 3. The latter is preferably of rectangular shape and made out of light material such as aluminum, sheet metal, plastic or the like properly protected against corrosion.

The power source is preferably a 12 VDC battery 96. Preferably, the timer device is connected to a separate second power source such as a 1.5 VDC battery 81. Obviously any other type of self-contained power source, such as solar panels or the like, could be considered without departing from the scope of the present invention.

Preferably, the housing 20 includes a protective cover 24 to protect the opening mechanism 90 from different weather conditions and to prevent any other type of damages that could affect the proper functioning of the feeding device 10.

When the feeder device 10 for animals is filled with food product F and arranged at a proper height H, a user puts into operation the electronic controller 82 by inserting the length of the pre-determined time interval(s) for the feed operating system 40 to start operation of the opening mechanism 90 using the keypad 84. The display 86 eases the programming operation by indicating all parameters to the user. Obviously, the operating system could allow for the length of the pre-determined time interval to be different between successive openings of the bottom walls 52 without departing from the scope of the present invention. For example, the length of the pre-determined time interval between the release of each pair of bottom walls 52 could be approximately twenty-four (24) hours while the length of the pre-determined time interval between the release of the two bottom walls 52 of a same pair could be only a few seconds so that the quantity of food product F contained in two compartments 50 would released every day.

According to the programming parameters of the timer device 80, the controller 82 activates the motor 92 that moves the chain 94. A first rod 95 on the chain 94 abuts and pivots a first hook component 54 to release the first pin 53 and open the bottom wall 52 of the first compartment 50 and release the food product F therefrom. The moving motion of the chain 94 lasts until a second rod 95 activates the limit switch 88 to stop the motor 92, just before the first rod 95 abuts and pivots a second hook component 54.

Then, after the pre-determined time interval elapsed, one day for example, the controller 82 activates again the motor 92 that restarts the chain 94 of the opening mechanism 90 to have the first rod 95 pivoting the second hook component 54 to release the second pin 53, open the bottom wall 52 of the second compartment 50 and release its food product F content. The moving motion of the chain 94 lasts, until a third rod 95 activates the limit switch 88 to stop again the motor 92 just before the first rod 95 abuts a third hook component 54.

The same operation takes place, successively, until all compartments 50 of the housing 20 are emptied and the first rod 95 activates the limit switch 88 to stop the motor 92.

At this time, the housing 20 can easily be put in lower position on the support structure 60 for the user to refill all compartments 50 with food product F, change the batteries 96, 81 if required, and reinstall the housing 20 in upper positions at height H to prevent animal-caused damages. Then, the same operating scheme can start over again.

Figure 8:
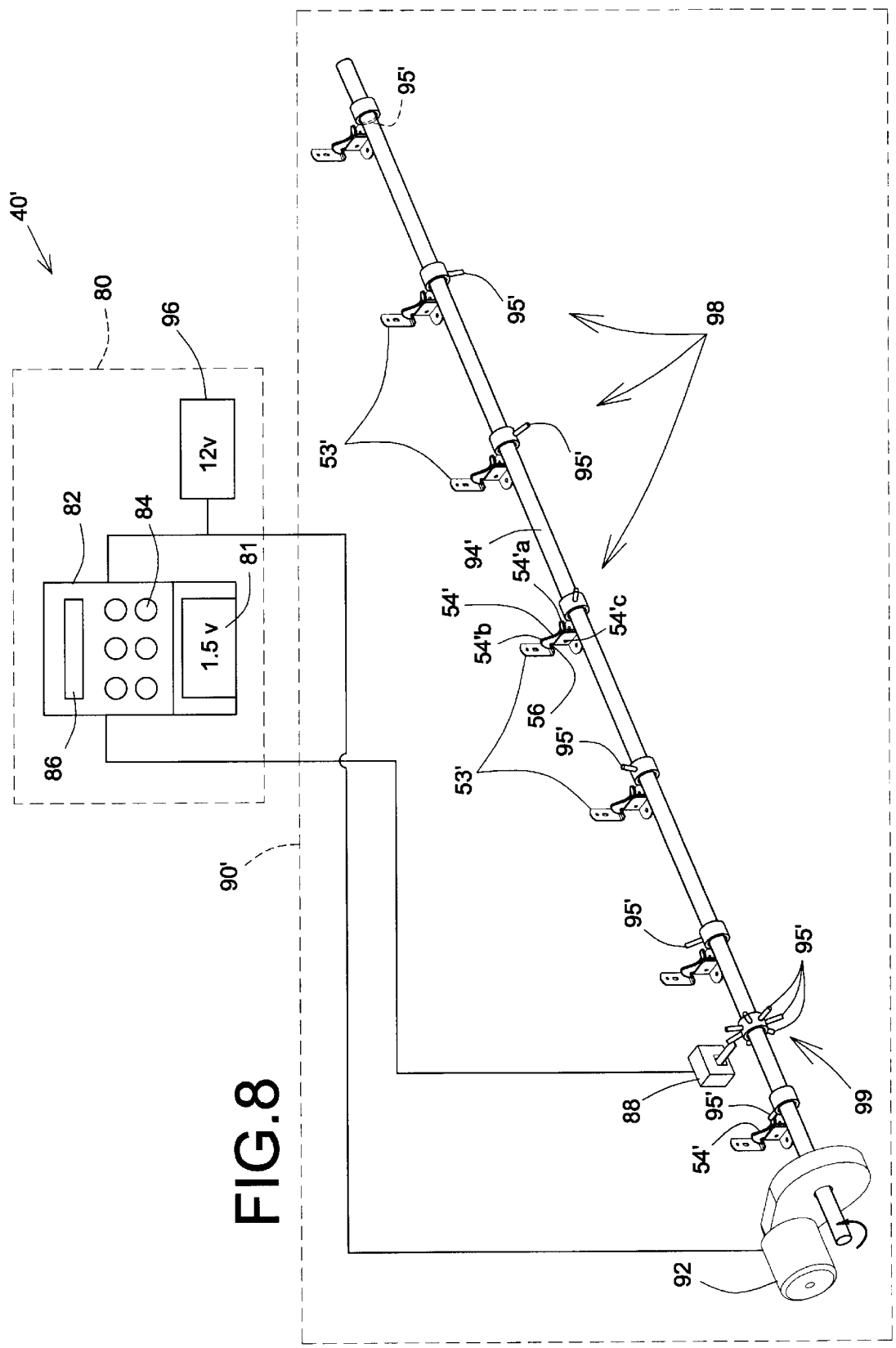
FIG. 8 is a schematic operating diagram of the embodiment of FIG. 7.

Referring to FIGS. 8 and 9, there is shown a feeder device 10' for animals according to another embodiment of the present invention with seven compartments (one for each day of the week for example), having a different opening mechanism 90' and a different locking mechanism.

In the embodiment shown in FIGS. 7 through 9c, intermediate section 54c' of the hook component 54' of each locking mechanism is pivotally mounted on the second wall end 52b while the pin component 53', or protruding plate, is attached to the housing 20' adjacent the second wall end 52b when the bottom wall 52 is in its closed position. The first hook end 54b' of the hook component 54', such as a conventional elbow catch type latch or the like, releasably engages the protruding plate 53' in its hooking configuration.

The opening mechanism 90' includes a shaft system activated by the motor 92. The shaft system includes a shaft component 94' and a plurality of rod components 95' radially extending therefrom in a circumferentially spaced apart relationship relative to each other about the shaft component 94' so that the rod components 95' alternately activate the hook components 54' by pivoting the latter from their hooking configuration to their unhooking configuration and the limit switch 88. Similarly to the embodiment 10 of FIGS. 1 through 6, the limit switch 88 is activated just after one hook component 54' has been activated so as to stop the electric motor 92 driving the opening mechanism 90' before the opening of the next adjacent bottom wall 52.

Figure 9A:
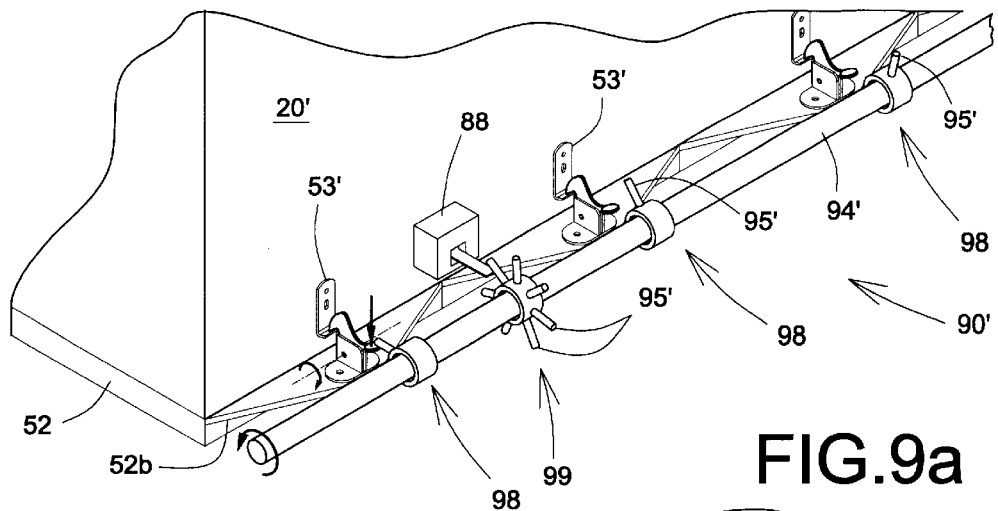
FIGS. 9a, 9b and 9c are partially enlarged broken perspective views, with sections taken out, of the opening mechanism of the embodiment of FIG. 7, showing the operation of the opening mechanism to successively open the different bottom walls.
Figure 9B:
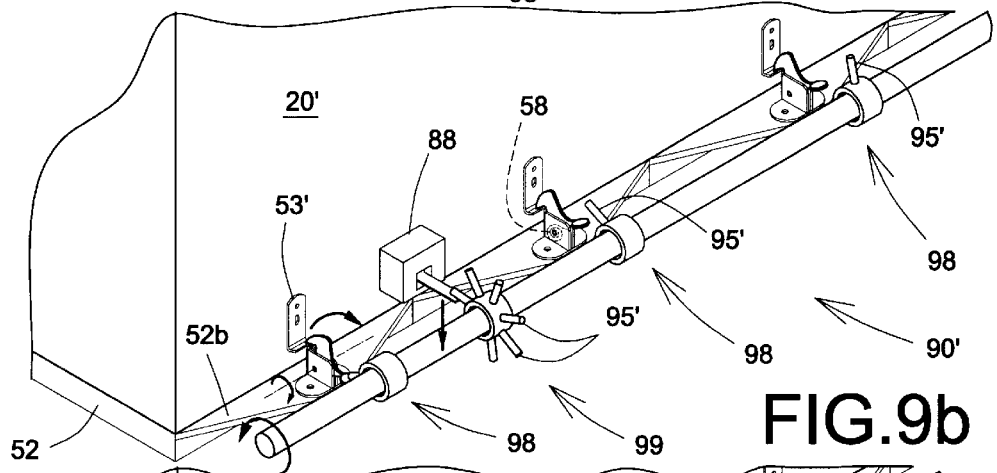

As illustrated in FIG. 9b in dotted lines, each hook component 54' include a biasing spring 58 for biasing the hook component 54' into its hooking configuration so that the bottom wall 52 is releasably secured in its closed position until one of the rod components 95' abuts the second hook end 54a' of the hook component 54' to pivot the latter into its unhooking configuration against the biasing spring 58, so as to release the bottom wall 52 into its open position.

Preferably, the rod components 95' are divided into a first set 98 and a second set 99. The rod components 95' of the first set 98 are used to successively activate the hook components 54' and are preferably circumferentially and longitudinally equally spaced apart from each other along the shaft 94' so as to form a helix pattern therearound. The rod components 95' of the second set 99 are used to successively activate the limit switch 88 and are preferably circumferentially equally spaced apart from each other about the shaft 94' so as to form a disc pattern thereabout. The rod components 95' of the first set 98 and the rod components 95' of the second set 99 alternately activate one of the hook components 54' and the limit switch 88, respectively.

As shown in FIG. 7, the protective cover 24' is preferably hingedly secured to the housing 20' to facilitate any maintenance and/or adjustments on the operating system 40' of the feeder device 10'.

Figure 9C:
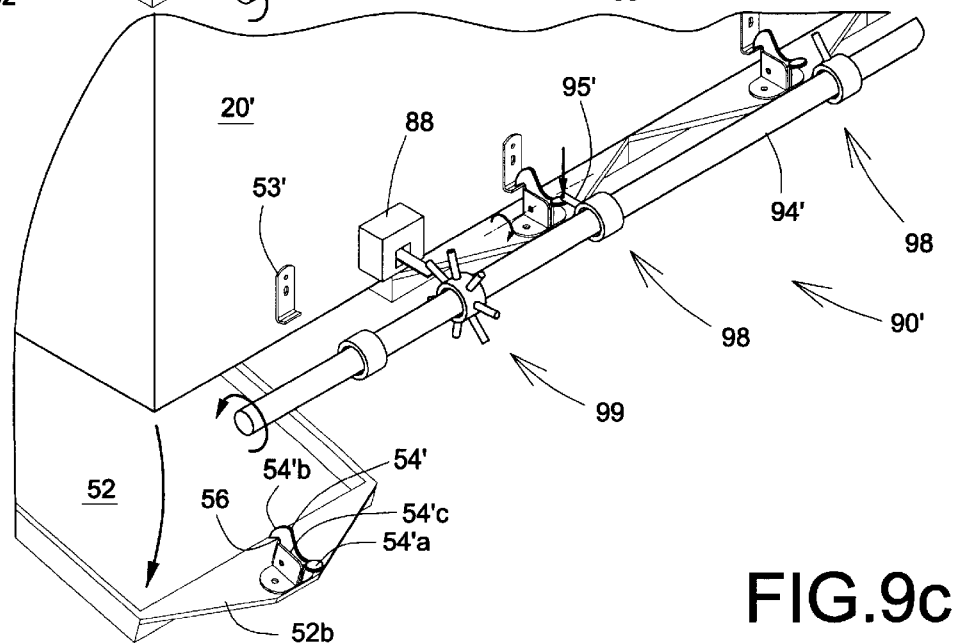

As illustrated in FIGS. 9a through 9c, the operation of the opening mechanism 90', once the compartments 50 are filled with food product F, is set to successively open the bottom walls 52. Preferably, the opening mechanism 90' starts with the first rod component 95' of the first set 98 abutting against the second hook end 54a' of the hook component 54' of the first locking mechanism, as shown in the left hand side of FIG. 9a. At this point, the hook component 54' starts pivoting from its hooking configuration to its unhooking configuration to open the corresponding bottom wall 52 while the first rod component 95' of the second set 99 abuts against the limit switch 88 to stop the opening mechanism 90' and the rotation of the shaft 94', as shown in FIG. 9b. Then the electronic controller waits for the selected pre-determined time interval has elapsed 82 before restarting the opening mechanism 90' so that the cycle is repeated with the second rod component 95' of the first set 98 abutting against the second hook end 54a' of the hook component 54' of the second locking mechanism, as shown in FIG. 9c.

Once all bottom walls 52 are released in their open position, an operator needs to close them off in their closed position by having all hook components 54, 54' of the locking mechanisms securing the corresponding pin members 53, 53' in their hooking configuration before refilling the compartments 50 with food product F so that the feeder device 10, 10' can be reset.

Although the present feeder device for animals has been described with a certain degree of particularity it is to be understood that the disclosure has been made by way of example only and that the present invention is not limited to the features of the embodiments described and illustrated herein, but includes all variations and modifications within the scope and spirit of the invention as hereinafter claimed.

I claim:

1. A feeder device for feeding animals with food product, said feeder device comprising:

a housing for being filled with said food product, said housing defining internal walls, said internal walls dividing said housing into a plurality of compartments adjacent to each other, each of said compartment having a bottom wall, said bottom wall defining generally opposed first and second wall ends, said first wall end being pivotally secured to said housing, said bottom wall pivoting between a closed position wherein said bottom wall retains said food product within said corresponding compartment and an open position wherein said food product is released from said corresponding compartment;

an operating system mounted on said housing and controlling opening of said bottom walls, said operating system including:

a locking mechanism located adjacent said second wall end of each of said bottom walls to secure said bottom wall in said closed position with said food product retained inside said corresponding compartment;

an opening mechanism successively activating said locking mechanisms so as to allow said bottom wall to pivot into said opened position and release said food product from said corresponding compartment;

a power source electrically coupled to said opening mechanism to power the latter; and a timer device electrically coupled said power source, said timer device including an electronic controller and a limit switch member electrically coupled thereto, said electronic controller being electrically coupled to said opening mechanism for operation thereof at the beginning of a pre-determined time interval, said limit switch member being activated by said opening mechanism and stopping operation of said opening mechanism during said pre-determined time interval wherein each of said locking mechanisms includes a pin component mounting on said second wall end and a hook component pivotally mounting on said housing adjacent said second wall end when said bottom wall is in said closed position, said hook component pivoting between a hooking configuration and an unhooking configuration, said hook component releasably engaging said pin component with said bottom wall in said closed position when in said hooking configuration and releasing said pin component with said bottom wall in said opened position when in said unhooking configuration.

2. The feeder device of claim 1 wherein said timer device further includes a key pad electrically coupled to said electronic controller for programming the latter about the length of said pre-determined time interval between successive activation of said opening mechanism to activate said locking mechanisms so that said bottom walls are allowed to pivot in said open position and release said food product from said corresponding compartment.

3. The feeder device of claim 1 further comprising a support structure releasably supporting said housing thereon, said support structure allowing for said housing to be installed at a pre-determined height to avoid animal-caused damages on said housing.

4. The feeder device of claim 3 wherein said support structure includes a strap member mounted thereon so that said feeder device is back carryable by a person.

5. The feeder device of claim 3 wherein said housing is slidably mounted on said support structure so that said pre-determined height is adjustable.

6. The feeder device of claim 1 wherein said opening mechanism activates one of said locking mechanisms at a time before activating said limit switch member, the latter stopping operation of said opening mechanism before activation of a successive of said locking mechanisms.

7. The feeder device of claim 1 wherein said opening mechanism includes a chain system and an electric motor driving said chain system, said chain system having a chain component with a plurality of rod components mounted thereon, said rod components being spaced apart from each other along said chain component so that said rod components alternately activate said hook components by pivoting the latter from said hooking configuration to said unhooking configuration and said limit switch member, whereby said limit switch member is activated just after one of said hook components has been activated so as to stop said electric motor of said opening mechanism before the opening of next adjacent of said bottom walls.

8. The feeder device of claim 7 wherein each of said hook components defines generally opposed first and second hook ends and an intermediate section therebetween, said intermediate section being pivotally attached to said housing, said first hook end including a pin aperture releasably receiving said pin component therein when in said hooking configuration, said rod components abuttingly engaging said second hook end to pivot said hook component from said hooking configuration to said unhooking configuration.

9. The feeder device of claim 8, wherein each of said locking mechanisms further includes a retainer component to limit pivoting movement of said hook component in said unhooking configuration so as to prevent said first hook end from getting too close to said chain system, thereby avoiding obstruction of the latter.

10. The feeder device of claim 1 wherein each of said compartments has a volume substantially equal the others.

11. The feeder device of claim 1 wherein said housing includes a top wall, said top wall being pivotally mounted on said housing between a top wall closed position to close off said compartments and a top wall open position to allow insertion of said food product into said compartments.

12. The feeder device of claim 1 wherein said power source is a 12 VDC battery.

13. The feeder device of claim 1 wherein said power source is a first power source, said operating system including a second power source electrically connected to said opening mechanism.

14. The feeder device of claim 13 wherein said first and second power sources are 1.5 VDC and 12 VDC batteries, respectively.

15. A feeder device for feeding animals with food product, said feeder device comprising:
 a housing for being filled with said food product, said housing defining internal walls, said internal walls dividing said housing into a plurality of compartments adjacent to each other, each of said compartments having a bottom wall, said bottom wall defining generally opposed first and second wall ends, said first wall end being pivotally secured to said housing, said bottom wall pivoting between a closed position wherein said bottom wall retains said food product within said corresponding compartment and an open position wherein said food product is released from said corresponding compartment;
 an operating system mounted on said housing and controlling opening of said bottom walls, said operating system including:
  a locking mechanism located adjacent said second wall end of each of said bottom walls to secure said bottom wall in said closed position with said food product retained inside said corresponding compartment;
  an opening mechanism successively activating said locking mechanisms so as to allow said bottom wall to pivot into said opened position and release said food product from said corresponding compartment;
  a power source electrically coupled to said opening mechanism to power the latter; and
  a timer device electrically coupled to said power source, said timer device including an electronic controller and a limit switch member electrically coupled thereto, said electronic controller being electrically coupled to said opening mechanism for operation thereof at the beginning of a predetermined time interval, said limit switch member being activated by said opening mechanism and stopping operation of said opening mechanism during said pre-determined time interval,
 wherein each of said looking mechanisms includes a hook component mounting on said second wall end and a pin component pivotally mounting on said housing adjacent said second wall end when said bottom wall is in said closed position, said hook component pivoting between a hooking configuration and a unhooking configuration, said hook component releasably engaging said pin component with said bottom wall in said closed position when in said hooking configuration and releasing said pin component with said bottom wall in said opened position when in said unhooking configuration.

16. The feeder device of claim 15 wherein said opening mechanism includes a shaft system and an electric motor driving said shaft system, said shaft system having a shaft component with a plurality of rod components radially extending therefrom, said rod components being circumferentially spaced apart from each other about said shaft component so that said rod components alternately activate said hook components by pivoting the latter from said hooking configuration to said unhooking configuration and said limit switch member, whereby said limit switch member is activated just after one of said hook components has been activated so as to stop said electric motor of said opening mechanism before the opening of next adjacent of said bottom walls.

17. The feeder device of claim 16 wherein each of said hook components defines generally opposed first and second hook ends and an intermediate section therebetween, said intermediate section being pivotally attached to said second wall end, said first book end including a pin aperture releasably receiving said pin component therein when in said hooking configuration, said rod components abuttingly engaging said second hook end to pivot said hook component from said hooking configuration to said unhooking configuration.

18. The feeder device of claim 17 wherein each of said hook components include a biasing spring, said biasing spring biasing said hook component into said hooking configuration so that said bottom wall is releasably secured in said closed position until one of said rod components abuts said second hook end to pivot said hook component into said unhooking configuration against said biasing spring, thereby releasing said bottom wall into said open position.

19. The feeder device of claim 16 wherein said rod components are divided into a first set and a second set, said rod components of said first set being used to successively activate said hook components, said rod components of said second set being used to successively activate said limit switch member, said rod components of said first set and said rod components of said second set alternately activating one of said hook components and said limit switch member, respectively.

* * * * *